United States Patent
Theriault et al.

(10) Patent No.: US 10,059,496 B2
(45) Date of Patent: Aug. 28, 2018

(54) DEVICE WITH REUSABLE SUPPORTS FOR PACKING FLAT ARTICLES AND CORRESPONDING METHOD

(71) Applicant: CONCEPTION IMPACK DTCI INC., Saint-Jacques (CA)

(72) Inventors: Dominic Theriault, Saint-Jacques (CA); Mathieu Tremblay, Laval (CA); Michel Beausejour, Joliette (CA)

(73) Assignee: CONCEPTION IMPACK DTCI INC., Saint-Jacques, Quebec (CA)

( * ) Notice: Subject to any disclaimer, the term of this patent is extended or adjusted under 35 U.S.C. 154(b) by 178 days.

(21) Appl. No.: 14/922,438

(22) Filed: Oct. 26, 2015

(65) Prior Publication Data
US 2016/0039589 A1 Feb. 11, 2016

Related U.S. Application Data

(63) Continuation of application No. PCT/CA2014/050398, filed on Apr. 25, 2014.

(30) Foreign Application Priority Data

Apr. 26, 2013 (CA) .................................. 2814275

(51) Int. Cl.
*B65D 71/70* (2006.01)
*B65D 63/10* (2006.01)
(Continued)

(52) U.S. Cl.
CPC .............. *B65D 71/70* (2013.01); *B65B 11/00* (2013.01); *B65B 27/08* (2013.01); *B65B 27/083* (2013.01);
(Continued)

(58) Field of Classification Search
CPC ......... B65D 71/70; B65D 61/00; B65B 11/00; B65B 27/08; B65B 27/083; B65B 35/50; B65B 61/22
(Continued)

(56) References Cited

U.S. PATENT DOCUMENTS 1,929,161 A * 10/1933 Coffin .................... B65D 71/04
206/451
3,307,691 A * 3/1967 Vallebona .............. B65D 85/48
206/451
(Continued)

FOREIGN PATENT DOCUMENTS

CA 2473878 A1 1/2006
EP 1352845 A1 10/2003
(Continued)

OTHER PUBLICATIONS

Translation in English of Written opinion from ISA dated Jul. 16, 2014 in PCT/CA2014/050398.
(Continued)

*Primary Examiner* — Chun Cheung
(74) *Attorney, Agent, or Firm* — IPAXIO S.E.N.C.

(57) ABSTRACT

The device enables a free-standing package to be formed with an open, light structure for packing a bundle of individual flat articles placed in direct juxtaposition and aligned along a straight longitudinal axis in the direction of the thickness of the flat articles. The device includes a pair of individual rigid lateral supports which are opposite each other and which rest directly on the respective sides of the bundle. The rigidity of the flat articles in the width direction is used to form the free-standing package. In particular the device enables the longitudinal compression of the flat articles to be controlled, which is useful in the case of flat articles which have a shape memory, such as folding cartons.

20 Claims, 17 Drawing Sheets

(51) Int. Cl.
  *B65B 27/08* (2006.01)
  *B65B 35/50* (2006.01)
  *B65B 61/22* (2006.01)
  *B65B 11/00* (2006.01)
  *B65D 61/00* (2006.01)
  *B65D 71/04* (2006.01)
  *B65D 71/06* (2006.01)
  *B65D 71/10* (2006.01)
  *B65D 81/05* (2006.01)

(52) U.S. Cl.
  CPC .............. *B65B 35/50* (2013.01); *B65B 61/22* (2013.01); *B65D 61/00* (2013.01); *B65D 63/10* (2013.01); *B65D 71/04* (2013.01); *B65D 71/066* (2013.01); *B65D 71/10* (2013.01); *B65D 81/054* (2013.01); *Y02W 30/807* (2015.05)

(58) Field of Classification Search
  USPC .................. 206/521–594, 494, 451, 454
  See application file for complete search history.

(56) References Cited

U.S. PATENT DOCUMENTS

| | | | |
|---|---|---|---|
| 3,809,311 A * | 5/1974 | Fohrman | B65D 75/004 206/424 |
| 3,880,308 A | 4/1975 | Stobb | |
| 5,174,448 A | 12/1992 | Flaig | |
| 5,439,114 A | 8/1995 | Lingle et al. | |
| 5,515,667 A | 5/1996 | Roosli | |
| 5,613,447 A | 3/1997 | Trickett | |
| 5,664,934 A | 9/1997 | Schaede et al. | |
| 6,905,021 B2 * | 6/2005 | Polumbaum | B65D 19/0018 108/55.1 |
| 7,344,021 B2 * | 3/2008 | Muraro | B65B 27/08 206/214 |
| 7,510,097 B2 | 3/2009 | Spindel et al. | |
| 2006/0081485 A1 | 4/2006 | Muraro | |
| 2007/0039848 A1 | 2/2007 | Burchell | |
| 2007/0140825 A1 | 6/2007 | Ruegsegger | |
| 2008/0264825 A1 * | 10/2008 | Hagan, III | B65D 19/0095 206/597 |
| 2010/0213088 A1 | 8/2010 | Goda | |
| 2011/0017616 A1 * | 1/2011 | Thomas | B65D 81/053 206/216 |
| 2012/0031897 A1 | 2/2012 | Robinson et al. | |
| 2013/0199954 A1 | 8/2013 | Huard et al. | |

FOREIGN PATENT DOCUMENTS

| | | |
|---|---|---|
| EP | 2431283 B1 | 8/2013 |
| EP | 2450283 B1 | 12/2014 |
| FR | 2869598 B1 | 4/2007 |
| JP | 05193672 A | 8/1993 |
| JP | 2008179374 A | 8/2008 |
| WO | 2014172793 A1 | 10/2014 |

OTHER PUBLICATIONS

Machine translation in English of FR-2869598.
Machine translation in English of JP-05193672.
Machine translation in English of JP-2008179374.
Machine translation in English of EP-1352845.

* cited by examiner

DEVICE WITH REUSABLE SUPPORTS FOR PACKING FLAT ARTICLES AND CORRESPONDING METHOD

REFERENCE TO A PREVIOUS APPLICATIONS

The present case is a continuation of PCT Application No. PCT/CA2014/050398 filed on 25 Apr. 2014. PCT/CA2014/050398 claims priority over the patent application filed in Canada on 26 Apr. 2013 under serial No. 2,814,275. The entire contents of these previous patent applications are hereby fully incorporated by reference.

TECHNICAL FIELD

The technical field concerns the packaging of flat articles, for example folding cartons whose compression across their thickness has to be minimized or otherwise controlled when they are packaged for transport and storage before use. The packaging is done using a device which includes a pair of lateral supports, which are reusable and economical, creating a free-standing package which is simple, practical, and effective. These lateral supports can in particular replace outer packaging in the form of protective boxes made of corrugated cardboard, which are often used in the folding cartons industry.

BACKGROUND

For a long time the folding cartons industry has been seeking an alternative solution, which is more economical, ecological, and practical, to overpacks in the form of corrugated cardboard boxes for packaging several individual flat articles which are juxtaposed to form a bundle. These corrugated cardboard boxes can only be reused a very few times, but because of their low cost and wide availability they are the most widespread solution. These boxes receive the flat articles and protect them until they are used, mainly during transport and storage before use.

There are other techniques for packaging flat articles, for example packaging with tensioned straps in which a certain number of flat articles are juxtaposed, in the direction of their thickness, then firmly compressed one against the other by means of one or several tensioned straps. The compressed flat articles form a relatively rigid block, which facilitates handling and reduces the overall dimensions. However this technique can damage the flat articles located at the ends and on which the straps are bent to follow the contour of the block of flat articles. Moreover, the relatively high tension that needs to be maintained to ensure that the flat articles effectively form a solid block can significantly reduce their shape memory and impair their subsequent use. The shape memory of flat articles which have been firmly compressed with tensioned straps can decrease significantly over time and even become zero. Shape memory is the natural tendency of flat articles to remain slightly open when they are new. In the case of folding cartons, this elasticity of the box body, in its flat configuration, may be very useful and even necessary when the boxes are later used in the packaging equipment, in particular automated equipment, used to handle each box before the use for which it has been designed. It is therefore desirable to preserve this shape memory between the stage of manufacture of the flat articles and their use. For these reasons, packaging with tensioned straps is generally only applied to some types of flat articles.

It should also be mentioned that putting flat articles into blocks with tensioned straps does not protect them as well as when they are put into corrugated cardboard boxes. In addition, when these blocks of articles are stacked on top of each other, all the weight of the top blocks is borne directly by the bottom blocks, which can damage the flat articles in the bottom blocks.

There are certain improvements for strap packaging, for example a stacker of bundles of stacked notebooks which inserts a wooden board at each end of the bundle of folding cartons (FR-2869598A1). This technique can avoid damaging the flat articles on the ends, but does not prevent many other disadvantages of strapping.

Other approaches (US-2012031897, EP-2431283, MX-2008003773) enable reusable packages to be formed, but these packages have a generic use and it is not practical to use them for packing flat articles such as folding cartons. In particular they are difficult to adapt to folding carton packaging machines, and are more expensive than corrugated cardboard boxes.

Despite everything that has already been proposed over the years, improvements in the technical field concerned are always and constantly necessary.

SUMMARY

The object of the invention is mainly to overcome several disadvantages in the state of the art.

More precisely, an object of the invention is to permit the creation of a reusable and economical package for the folding cartons industry and for other types of flat articles.

Another object of the invention is to be able to control the compression of the juxtaposed flat articles so as to preserve their shape memory.

Another object of the invention is to permit the hermetic packaging of flat articles when this is necessary.

Another object of the invention is to allow packages containing flat articles to be stacked, with their weight being supported by lateral supports.

Another object of the invention is to be able to facilitate and optimize the efficiency of transport and storage of the side supports of the package device after use, in other words when they are returned empty to a place where these lateral supports can be used again for packing new flat articles. In particular the invention enables the quantity of empty lateral supports that can be placed on a transport pallet to be maximized, and the stacking time to be minimized.

Another object of the invention is to be able to adapt the process of packing folding cartons or other flat articles for an application with the reusable package device of this invention.

In brief, the device includes a pair of rigid lateral supports which hold a bundle of juxtaposed flat articles, over a fixed length, in order to control the compression of the flat articles, in particular flat articles which have a shape memory or spring effect. This device with lateral supports is distinguished from packages of the previous art by the fact that the lateral supports form a light and open structure which also uses the rigidity of the flat articles packed, in the direction of their width, to form a free-standing package.

According to a first aspect, there is provided a device for forming a free-standing package with an open, light structure for packing a bundle of individual flat articles, with each flat article having a height, width, and thickness, which thickness is a smaller dimension than the width and thickness, the bundle being formed from several of these flat articles placed in direct juxtaposition and aligned, along a straight longitudinal axis, in the direction of the thickness of the flat articles, the bundle having a height, width, and length, with the length of the bundle being in the direction of the longitudinal axis, the device including: a pair of individual rigid lateral supports, which are opposite each other and which rest directly on the respective sides of the bundle, each lateral support comprising a main side wall positioned parallel to the longitudinal axis in the package, the main side wall comprising an outer face and an inner face, the inner face resting directly on a corresponding lateral ridge of each of the flat articles in the bundle in order to immobilize them in a cavity formed between the two opposite inner faces of the two lateral supports, the height and length of the cavity being at least equal to the height and length of the bundle, each lateral support also having an inner part which vertically supports each of the flat articles in the cavity; and means incorporated in the free-standing package for holding the lateral supports in the packaging position against the bundle.

According to another aspect, there is provided a pair of lateral supports which hold, control the compression of, and protect a bundle of flat and preferably identical flat articles, laid side by side in the same orientation or alternately in packs, the pair of lateral supports forming an open structure on each side of the bundle. This pair of lateral supports may have openings which are cut in the flat wall of at least one of them. Moreover, the first lateral support may comprise a rim orientated towards the inside to delimit a first lateral receptacle configured to accommodate one of the lateral sides of the bundle made up of several flat articles, and the second lateral support may also comprise a rim orientated towards the inside to delimit a second lateral receptacle configured to accommodate the other lateral side of the bundle; the first and second receptacles can be symmetrical. The lateral supports can in particular be made of plastic, aluminum, or another metal, or carbon fiber. If desired, the outer wall of each lateral support may thus comprise a profile to facilitate strapping of the lateral supports around the bundle and holding it in place.

According to another aspect, there is provided a free-standing package consisting of a bundle which includes a set of flat articles substantially parallelepiped in shape which are held by the effect of a compression force generated by means of two opposite lateral supports, each lateral support being positioned laterally on one side and the other of the bundle. These lateral supports may be attached in different ways, for example by using at least one of the following technologies: hooping, tying with string, wrapping in stretch film, or covering with heat-shrink film. Other techniques are also possible.

According to another aspect, there is provided a free-standing package consisting of a bundle made of a set of flat articles which are substantially parallelepiped in shape and which are held in position under the effect of a compression force transmitted using two lateral supports, with each lateral support being positioned on one side and the other of the bundle and the bundle being held in position in a cavity formed between two opposite interior faces of the two lateral supports, the cavity having a height and a length that are at least equal to the height and the length of the bundle, each lateral support also having an internal part that vertically supports each of the flat articles.

According to another aspect, there is provided a ready-to-deliver pallet including several identical flat articles laid out in juxtaposition to form free-standing packed packages, as defined above. Two packed packages are preferably only in contact at the lateral supports. Nevertheless it is also possible not to have any direct contact between two packages packed adjacent to each other at the time of handling.

According to another aspect, there is provided a method of manufacture of a free-standing package using a device as defined above, the method including:
the positioning of the lateral supports to form the cavity spaced slightly further apart than the width of the bundle and the locking of these lateral supports in position during loading of the flat articles into the cavity;
the filling of the cavity by the many individual flat articles in order to form the bundle;
optionally, the handling of the flat articles preassembled in the form of a bundle towards the cavity situated between the lateral supports; and
the packing of the bundle by exerting, using the lateral supports, pressure on the lateral ridges of each flat article in the bundle.

If desired, the lateral pressure exerted using the lateral supports may be adjusted so as not to affect or damage the flat articles.

The manufacturing method may be configured for continuous or discontinuous production of the packages.

During the packing of the flat articles, these may be loaded manually and/or automatically between each lateral support, for example in the same way as they are loaded into a corrugated cardboard box. The lateral supports are positioned and held in place during the filling stage, for example using positioning components built into the lateral supports or by other techniques. When filling is completed, the bundle of flat articles and the pair of lateral supports are secured to form a free-standing package which, for example, can be stacked directly onto a transport pallet.

This invention can therefore usefully remedy several disadvantages of traditional packaging methods for flat articles, as in particular it offers the following possibilities:
virtually unlimited use of the lateral supports;
a solution which is financially competitive with corrugated cardboard boxes;
the formation of a rigid but light structure of fixed length around the flat articles, in order to secure them with a controlled compression rate;
protection of the bundle to avoid damaging the flat articles during sealing and/or strapping, and also during handling;
the formation of a free-standing package which permits the stacking, onto a transport pallet, of a large number of packed flat articles without risk of damaging them; and
if desired, a hermetic seal can be made, for example by using a stretch or heat-shrink film.

The invention also includes the methods, processes, and mechanisms of adaptation to some types of flat article packaging machines, automatic or universal, to facilitate the use of the invention in industry.

Further details of the different aspects of the proposed concept and on the various possible combinations of technical characteristics will emerge in the light of the detailed description below and the corresponding figures.

DETAILED DESCRIPTION

Figure 1:
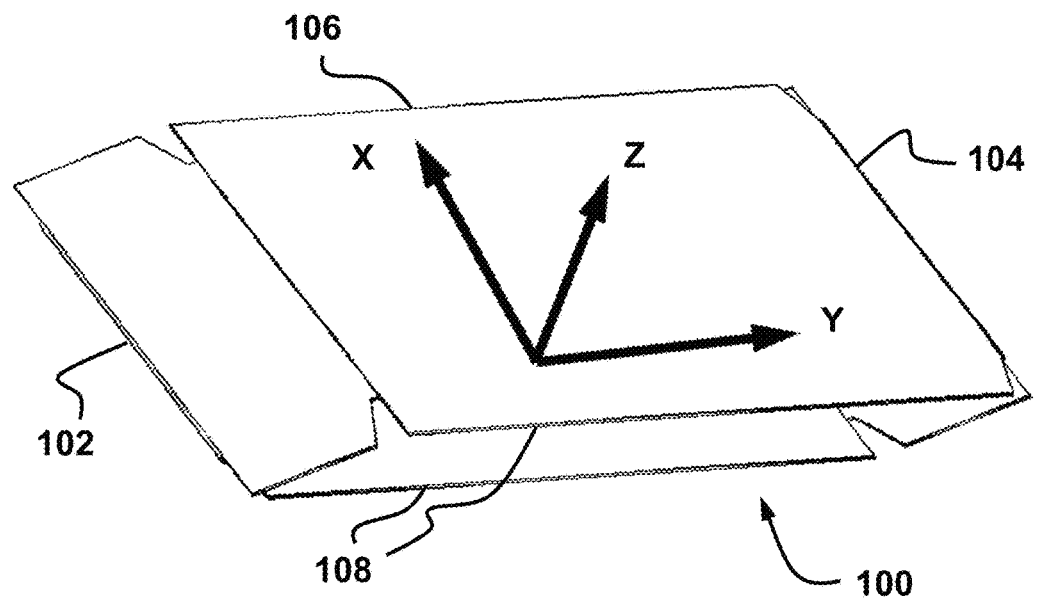
FIG. 1 illustrates an example of a flat article, to be precise a folding carton.

FIG. 1 shows an example of a flat article, to be precise a folding carton 100. The box 100 is only one example among a very wide range of possibilities. It is therefore important to emphasize that the flat articles in question are not limited to folding cartons, and that other types of flat articles may be usefully packed by means of the proposed concept.

The flat articles may be made of different materials, for example cardboard, strong compact cardboard, corrugated cardboard, semi-rigid plastic, microgrooved cardboard, etc. In addition, the fact that most of the detailed description below presents flat articles as being folding cartons, in particular boxes like that in FIG. 1, is only to simplify the textual description. In addition, the shape of the box 100 is substantially generic in the different figures.

The profile of box 100 is substantially parallelepiped in shape in FIG. 1, although different shapes are possible depending on requirements. The box 100 is in its flat configuration before use, in other words the box 100 is empty and open at its two opposite ends and the four panels of this model of box 100 are positioned so to reduce the internal volume of the box 100 for packing. The body of this box 100, formed by the four glued panels, has a natural tendency to remain slightly open when the box 100 is simply placed on a surface when it is in the flat configuration, as shown in FIG. 1. This natural tendency is also called "shape memory". The box 100 is considered to be in the flat configuration even if it is slightly open because of this shape memory phenomenon. The body of the box 100 thus presents a certain degree of elasticity, or "spring effect", which can be very useful, or even necessary, when the box 100 will later be used in the packaging equipment, in particular automated packaging equipment serving to handle each box 100 before the use for which it has been designed.

The box 100, in its flat configuration, has a length, width and thickness. The length corresponds to the X axis of the device of coordinates in FIG. 1, the width corresponds to the Y axis, and the thickness corresponds to the Z axis. The thickness of the box 100, in its flat configuration, is of a dimension which is significantly smaller than the length and width. The X and Y axes define the transversal plane of the box 100. The box 100 is significantly rectangular in shape in the example shown in FIG. 1. Other shapes are also possible.

The box 100 has lateral ridges 102, 104. It also has a top ridge 106 and a bottom ridge 108. In this example, the top ridge 106 consists of the top ridges of the different panels forming the box 100 and the bottom ridge 108 consists of the bottom ridges of the different panels forming the box 100.

Figure 2:
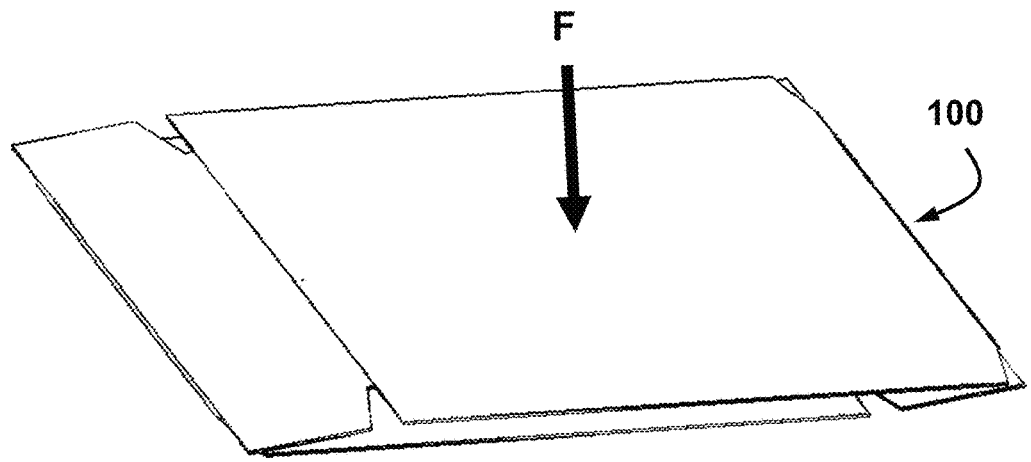
FIG. 2 is a similar view to FIG. 1, in which the flat article receives a force on the outside of its main top panel for demonstration purposes.

FIG. 2 is a similar view to FIG. 1, but it shows a force F which is exerted at the center of the main top panel of the box 100. This force F is only for the purpose of demonstrating the shape memory. As may be observed, the force F brings the two main panels closer together. When the box 100 has a shape memory, it spontaneously returns to the position shown in FIG. 1 as soon as the force F is removed.

At the outlet of the equipment which manufactures the boxes 100, a number of individual boxes 100 are put together and juxtaposed so as to form a lot or pack which is called a bundle of flat articles. The boxes 100 will be transported and stored until they are used, and meanwhile they are combined into bundles to facilitate their handling and reduce their overall dimensions. The boxes 100 may be placed in the bundles according to the same orientation and/or be positioned alternately, individually or in groups.

Figure 3:
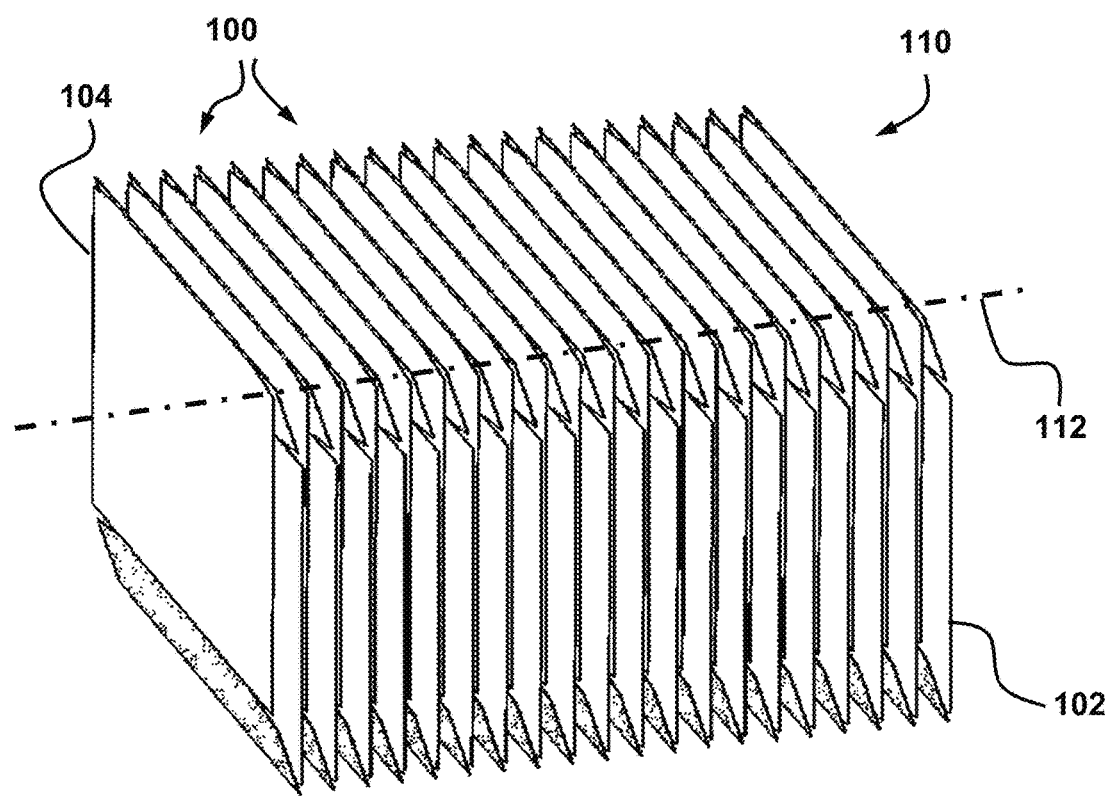
FIG. 3 is an isometric view showing an example of a large number of flat articles which are placed in juxtaposition to form a bundle, with these flat articles all being identical to that in FIG. 1.

FIG. 3 is an isometric view which shows an example of a bundle 110 formed by the juxtaposition of several boxes 100 of FIG. 1 in the direction of their thickness, in other words in the direction of the Z axis (FIG. 1). The boxes 100 of the bundle 110 are all identical. They are parallel to each other and are positioned along a longitudinal axis 112, which is a straight line and crosses the geometric center of the boxes 100. The lateral ridges 102, 104 of each box 100 are lined up and substantially positioned vertically in relation to each side of the bundle 110.

The challenge is to maintain the natural elasticity and integrity of each box 100 between the time of its manufacture and its removal from the bundle 110, and so to avoid having to compress the boxes 100 directly in the direction of their thickness using tensioned straps but without having to place them in an outer packaging consisting of a corrugated cardboard box or a similar type of container.

The approach proposed by this concept has recourse to a device which comprises a pair of rigid lateral supports 130, which can be reused and are economical, in order to create a free-standing package 120 with the bundle 110 itself.

Figure 4:
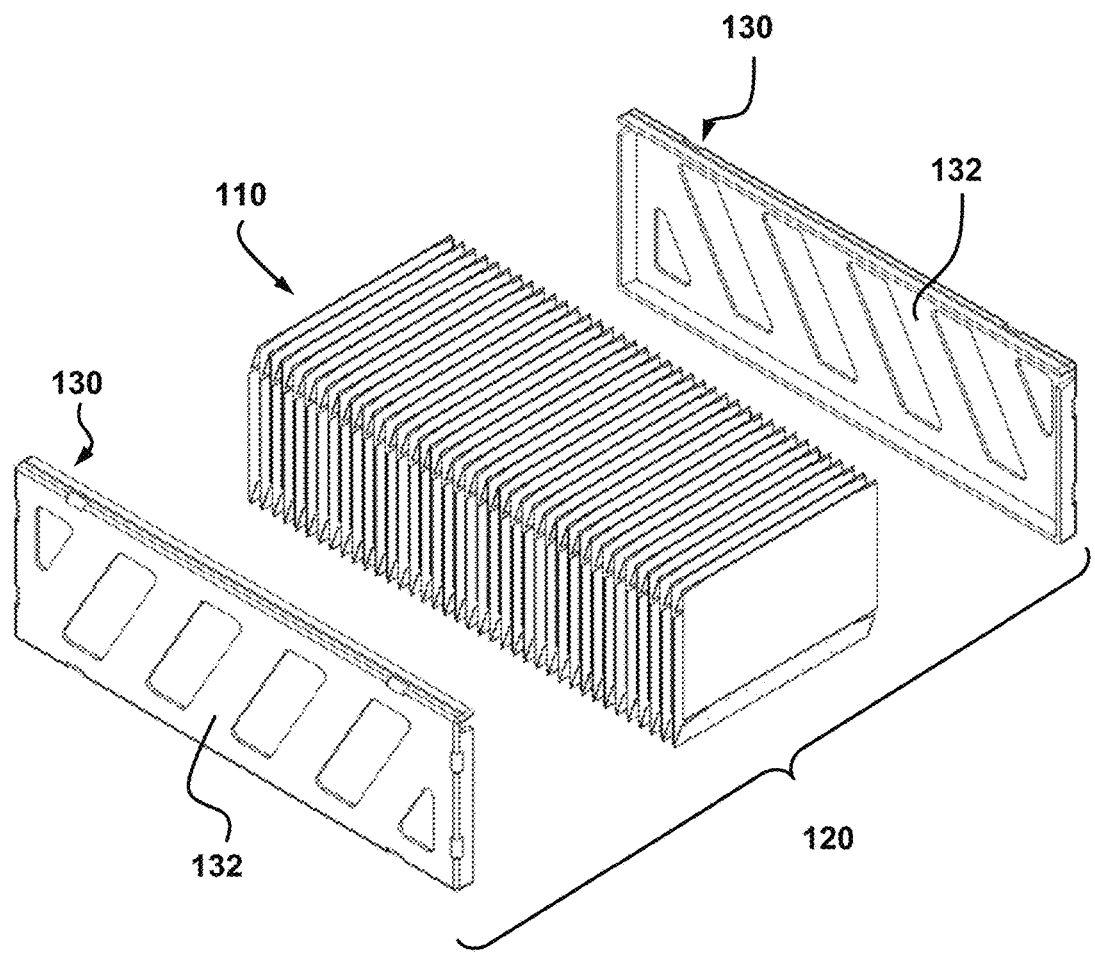
FIG. 4 is an exploded isometric view showing an example of lateral supports according to the proposed concept, and which rest against the side of the bundle of FIG. 3.

FIG. 4 is an exploded isometric view showing an example of lateral supports 130 according to the proposed concept and which rest against the side of the bundle 110 of FIG. 3. These lateral supports 130 are positioned vertically against the opposite sides of the bundle 110. They will thus be parallel to each other when used on the bundle 110 to form a rigid but light structure on the package 120. The lateral supports 130 are rectangular in shape in the example illustrated. The length and height of these lateral supports 130 correspond approximately to the length and height of the bundle 110.

It should be noted that the boxes 100 in the bundle 110 can be partially compressed in the direction of their thickness in order to reduce the volume. However the compression rate is controlled to be notably less than that on boxes compressed firmly by tensioned straps according to the previous methods. The compression rate of the boxes 100 inside the package 120 is chosen so that the boxes 100 retain most, if not all, of their original shape memory when they are removed from this package 120.

The length and height of the lateral supports 130 are determined by the dimensions of the boxes 100 of the bundle 110, the quantity of boxes 100 per bundle, and the desired compression rate. The height of the lateral supports 130 is preferably greater than that of the boxes 100 in order to avoid the boxes exceeding them, at the top and/or the bottom, and being damaged when the packages 120 are stacked on top of each other, for example on a transport pallet or during handling.

The lateral supports 130 are identical in the example illustrated, to simplify inventory management and production costs. The left lateral support 130 and right lateral support 130 are therefore identical. However, it is possible to manufacture a pair of lateral supports 130 in which the two are not identical.

Since the lateral supports 130 are identical in the example described above, the following detailed description refers to the "lateral support 130" in the singular.

Figure 5:
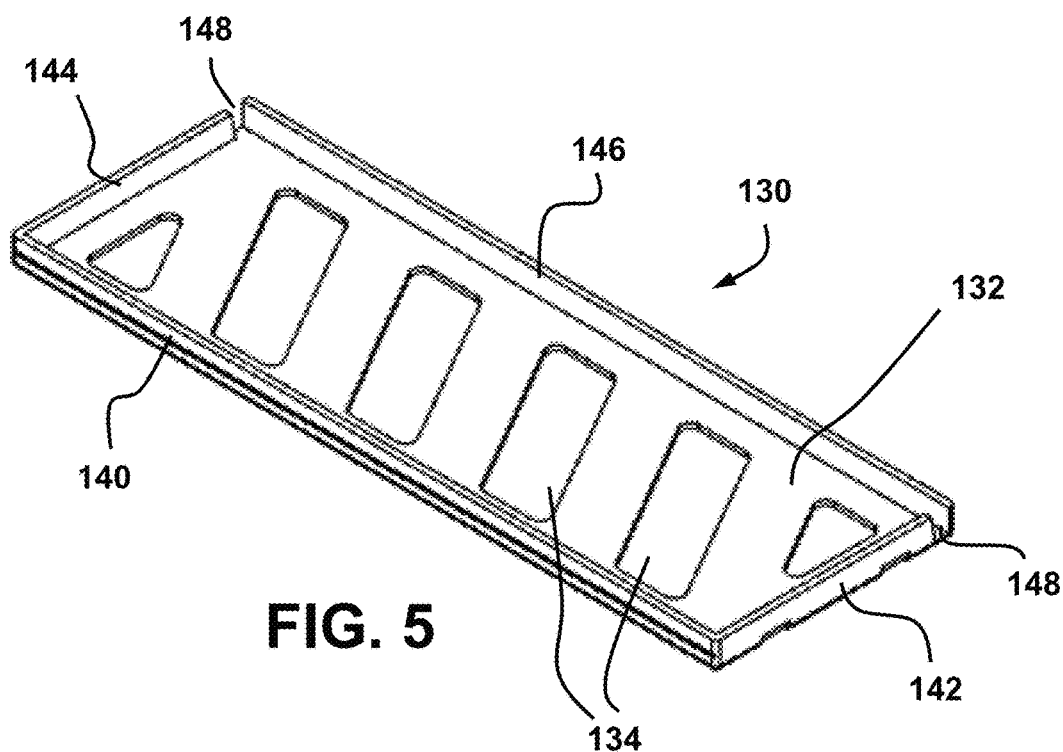
FIG. 5 is an isometric view showing the inner face of the lateral support used in FIG. 4.
Figure 6:
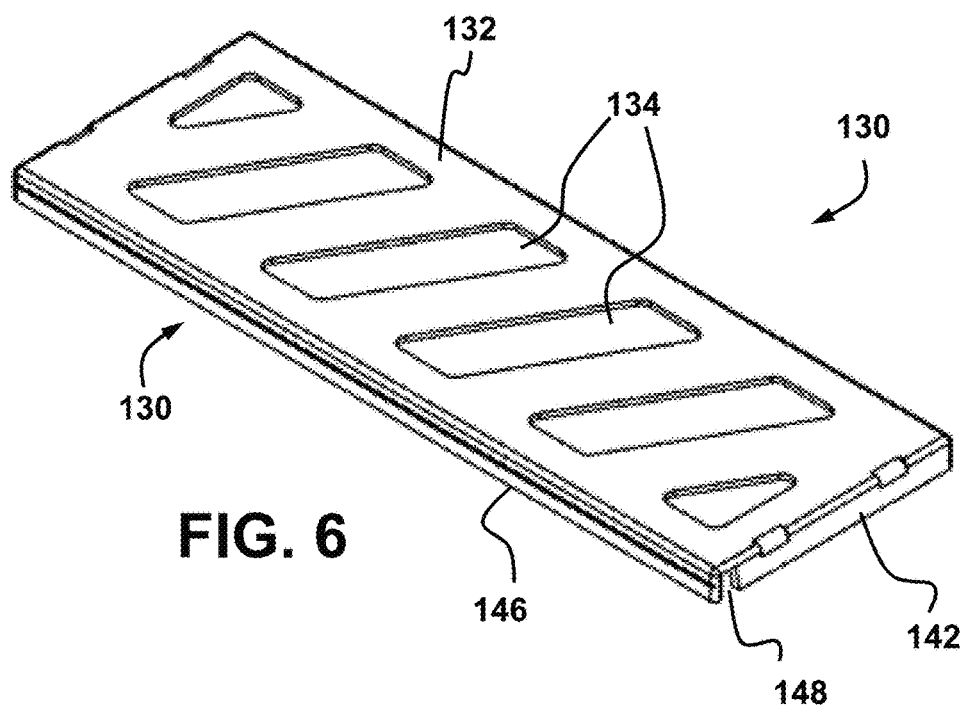
FIG. 6 is an isometric view showing the outer face of the lateral support used in FIG. 4.

FIG. 5 is an isometric view showing the inner face of the lateral support 130 used in FIG. 4. FIG. 6 is an isometric view showing its outer side. As may be observed, the lateral support 130 has a main side wall 132 which is substantially rectangular and flat in shape. This may comprise one or several openings 134 of different shapes, as shown in this example, so as to reduce the quantity of material required for its manufacture and also to make the lateral support 130 lighter. The main side wall 132 will be substantially in a vertical position when in typical use in a package 120.

In the example illustrated mainly in FIGS. 5 and 6, the lateral support 130 has four rims 140, 142, 144, 146 which protrude towards the interior perpendicularly to the main side wall 132. They each extend along a corresponding ridge of the main side wall 132 and border the inner face of the latter. Each of the rims 140, 142, 144, 146 is generally flat and straight. These rims 140, 142, 144, 146 are preferably of identical width, for example 3 to 5 cm, all around the main side wall 132. The width is however kept small to minimize the overall dimensions of the empty lateral supports 130 when they are interlocked or otherwise stacked. The rims 140, 142, 144, 146 also give increased resistance to bending or other forms of deformation.

In addition, the rims 140, 142, 144, 146 firmly hold the flat articles of the bundle 110, at the top and the bottom, but also at the front and the back, when the lateral support 130 rests on the lateral side of the bundle 110. The boxes 100 of the bundle 110 are then immobilized when the package 120 is completed. The top surface of the bottom rim 140 in particular receives the bottom of the boxes 100 of the bundle 110 and supports them against the action of gravity. The rims 140, 142, 144, 146 are molded in or otherwise securely attached to the main side wall 132. It should be noted that variants of these different characteristics are possible.

The vertical rims 142, 144 in the example also include opposite notches 148 at one end (in this case, the top end). These notches 148 are lined up with each other so that the empty lateral supports 130 can be interlocked to reduce the thickness of the space occupied by the pairs and so optimize the quantity that can be placed on a transport pallet after each use. Variants are nevertheless possible.

The lateral support 130 is preferably manufactured in a single monolithic piece with sufficient thickness to obtain the desired maximum stacking capacity at the time of use. It may be manufactured from different materials, for example plastic, aluminum, or carbon fiber. Other materials are also possible. The choice of material is mainly determined by factors such as its cost, its rigidity, the minimum number of times the support can be reused, whether it can be recycled, and its phytosanitary properties, to name but a few.

If necessary, each lateral support 130 may include a traceability element by RFID or other similar device.

Figure 7:
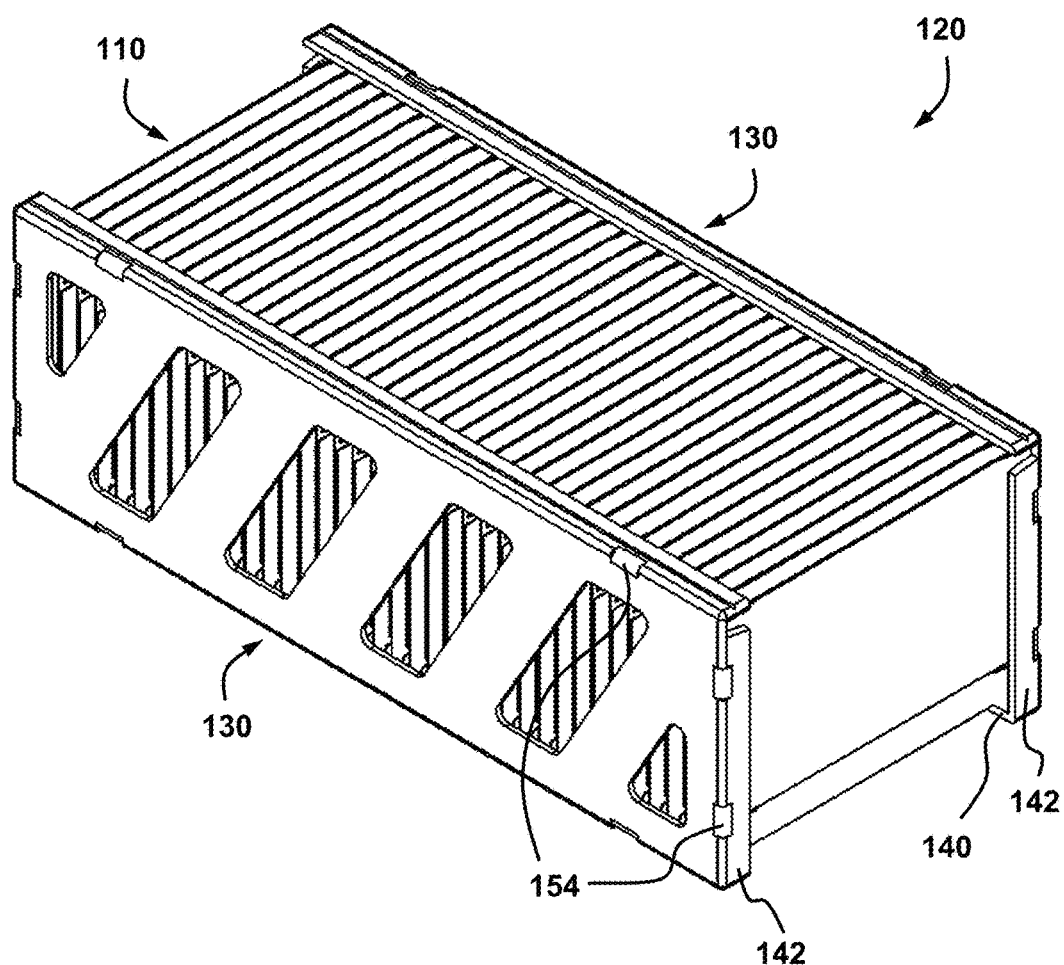
FIG. 7 is an isometric view showing the bundle and the lateral supports illustrated in FIG. 4 when the lateral supports are the position of use.

FIG. 7 is an isometric view showing the bundle 110 and its lateral supports 130 illustrated in FIG. 4 when in the position of use. The inner face of the main side wall 132 of each lateral support 130 rests on all the corresponding lateral ridges 102, 104 of the boxes 100 in the bundle 110.

As the longitudinal compression of the bundle 110 is limited by the fixed length of the lateral supports 130, a large number of means can be used to hold the lateral supports 130 in place against the bundle 110, which means will be integral to the package 120. For example, the means may be horizontal and/or vertical strapping and/or a film-wrapped package. A film may be used with or without strapping/string to form a hermetic package. The film may be stretch or shrink. Other means are also possible.

Once secured the lateral supports 130 will in particular hold the weight of the boxes 100 of the bundle 110 which is inside and prevent direct contact between it and an external surface. Moreover, the boxes 100 placed in the bundle may be subjected to relatively high compression in the transversal direction, in other words along the Y axis (FIG. 1), without their mechanical properties being significantly affected when they are taken out of the bundle 110. The compression force is thus distributed among the boxes 100 over the whole length. The inner surface of the lateral supports 130 is also preferably designed to rest on as much of the length as possible of the lateral ridges 102, 104 of the boxes 100 to avoid creating localized pressure points. The boxes 100 of the bundle 110 thus become an integral part of the structure of the package 120.

Figure 8:
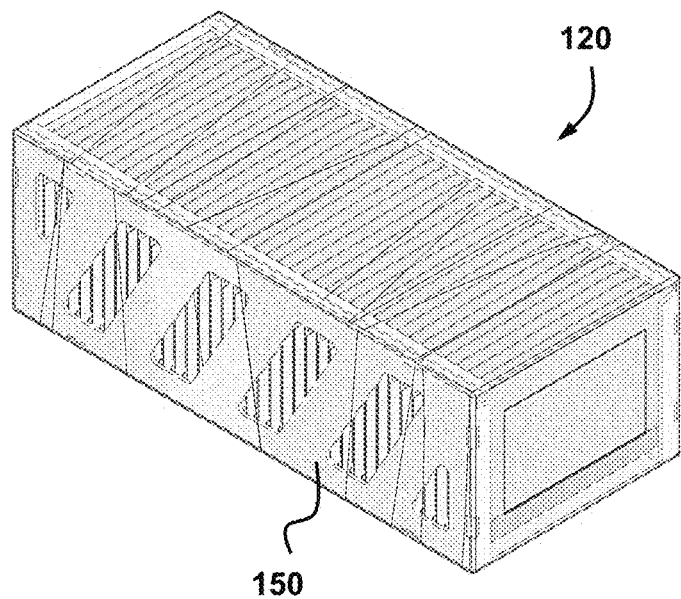
FIG. 8 is a similar view to FIG. 7, but showing an example of stretch film placed around the lateral supports and the bundle, to form the end package.

FIG. 8 is a similar view to FIG. 7, but on which a protective film 150, for example an impermeable film, has been placed to attach the lateral supports 130 but also to create a hermetic barrier around the bundle 110. This film may be made of plastic, in particular stretch plastic which has been wrapped several times around the lateral supports 130 and the bundle 110. Other types of film can also be used. It should be noted that in FIG. 8, and for the purposes of illustration, the film appears to be very transparent so as not to hide the items underneath.

Figure 9:
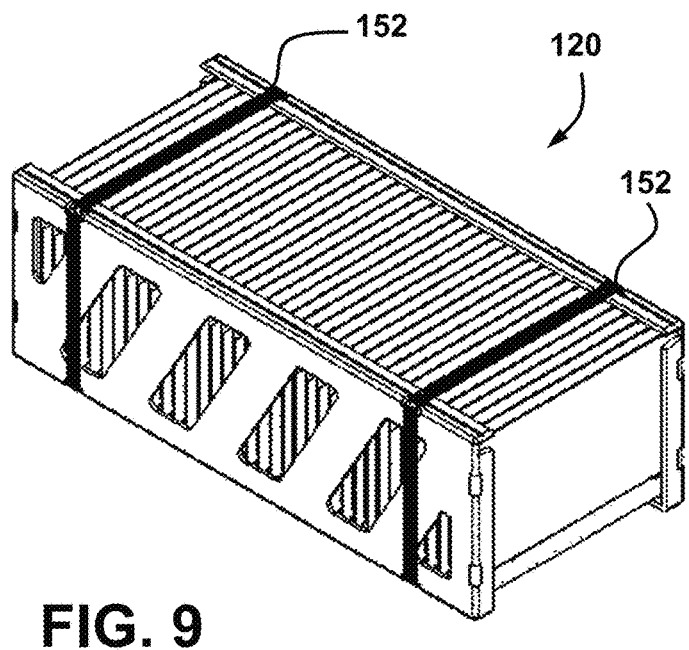
FIG. 9 is an isometric view illustrating an example of a free-standing package in which the lateral supports are secured by means of tensioned straps.

FIG. 9 is an isometric view showing an example of a package 120 in which the lateral supports 130 are secured by means of tensioned straps 152, which are spaced apart from each other and positioned in the transversal plane around the lateral supports 130. There can also be straps going around the pair of lateral supports 130 horizontally and several means of attachment may be combined.

As may be observed in the examples illustrated, each lateral support 130 can include rounded outer grooves 154 serving to maintain the orientation of the straps and to better distribute the tightening force in the corners of the package 120. So when tensioned straps are used, they do not exert direct force on the flat articles. Variants are also possible.

Figure 10:
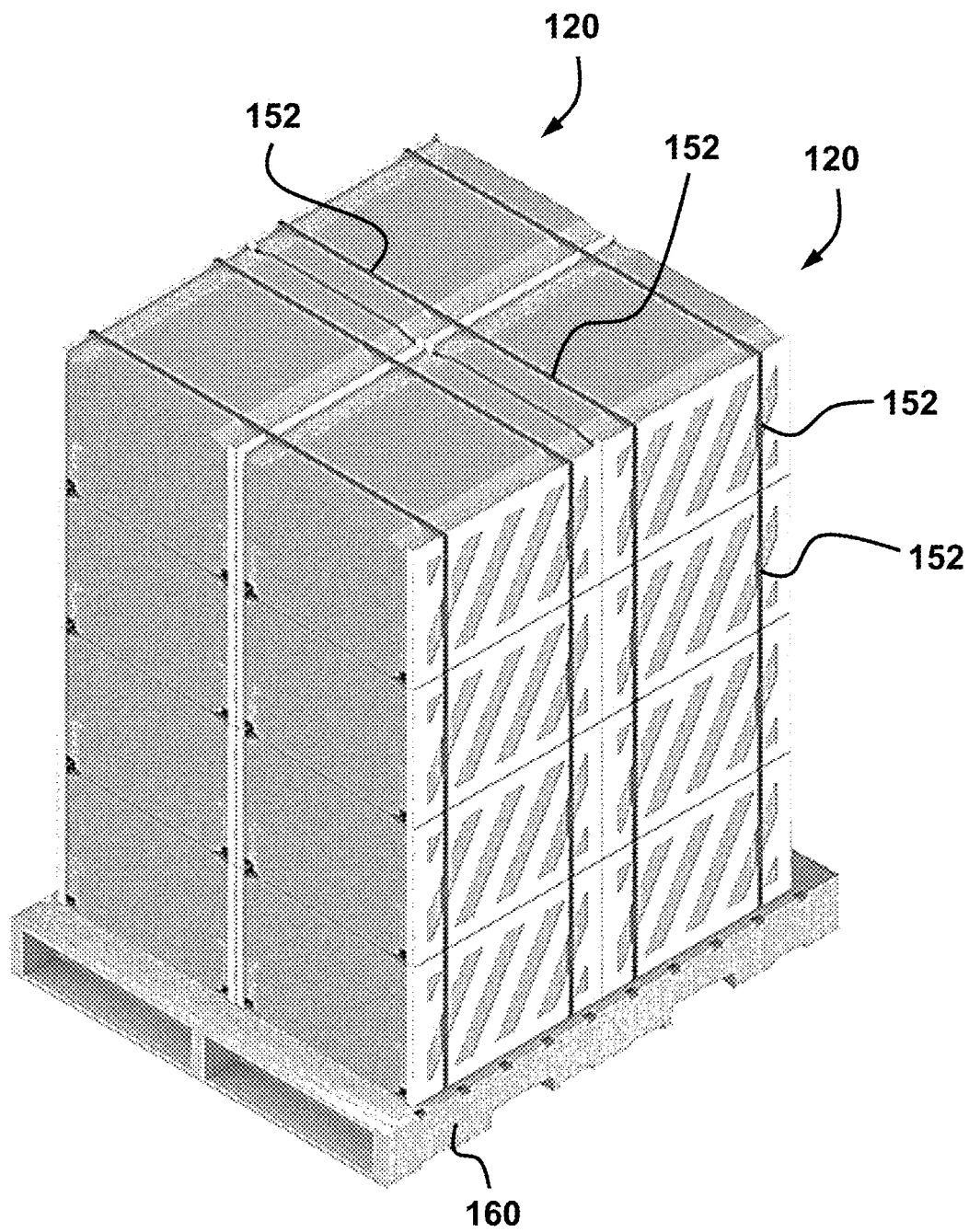
FIG. 10 is an isometric view giving an example of a transport pallet on which several free-standing packages have been placed.

FIG. 10 is an isometric view showing an example of a transport pallet 160 on which several completed packages 120 have been placed. These packages 120 have been stacked one on top of the other directly on top of the transport pallet 160. The palletization efficiency of the bundles 110 with the lateral supports 130 is substantially the same as for corrugated cardboard boxes. So the fact of using lateral supports 130 does not in any way impair the loading capacity of the packages 120 on the transport pallet 160. The lateral supports 130 even have the advantage that the weight of the bundles 110 is transmitted solely between the lateral supports 130 and their stacked loading capacity can easily be considerably higher than in the case of a simple corrugated cardboard box.

It should be noted that in FIG. 10, each package 120 is secured by its own pair of tensioned straps 152. The different packages 120 may be secured to the transport pallet 160 using stretch film or any other appropriate means.

Figure 11:
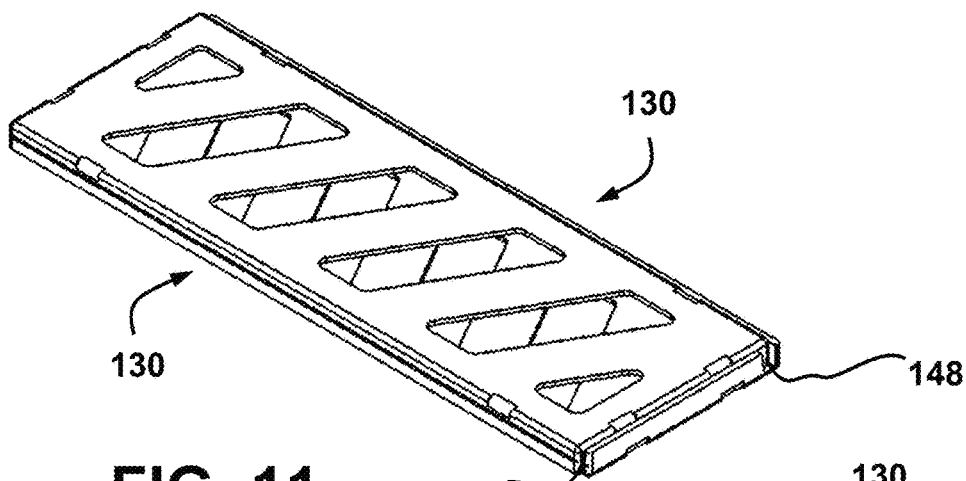
FIG. 11 is an isometric view illustrating that the two lateral supports like those shown in FIG. 4 can be interlocked when they are not used around a bundle.

FIG. 11 is an isometric view showing that two lateral supports 130 like those shown in FIG. 4 can be interlocked when they are not used around a bundle. It may be observed that in this example, the notches 148 allow the rims 140, 142, 144, 146 to meet at right angles without interference.

Figure 12:
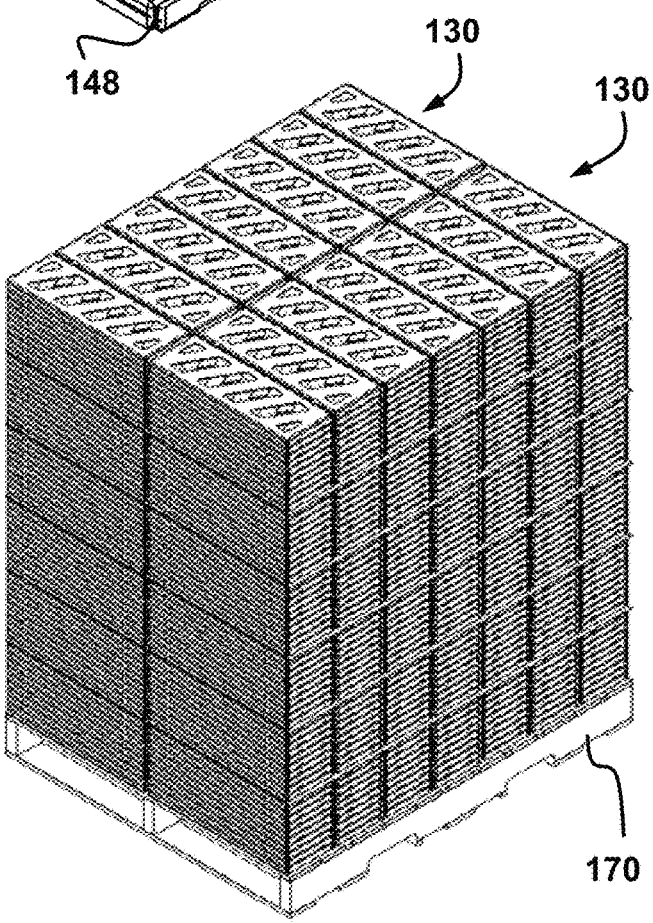
FIG. 12 is an isometric view showing an example of a transport pallet on which a large quantity of pairs of interlocked lateral supports like those shown in FIG. 11 have been placed.

FIG. 12 is an isometric view showing an example of a transport pallet 170 on which a large number of pairs of lateral supports 130 interlocked like those in FIG. 11 are placed. The many pairs of lateral supports 130 are placed one on top of the other. The compact size of these lateral supports 130 and their ability to interlock in pairs mean that a large number of empty lateral supports 130 can be stacked on the transport pallet 170 so minimizing transport costs. For maximum efficiency, it must be possible to stack as many as or even more empty lateral supports 130 on the transport pallet 170 than empty corrugated cardboard boxes designed to receive the boxes 100 of the same size as those used with the lateral supports 130. The lateral supports 130 may be secured to the transport pallet 170 using, for example, stretch film or any other appropriate means.

Figure 13:
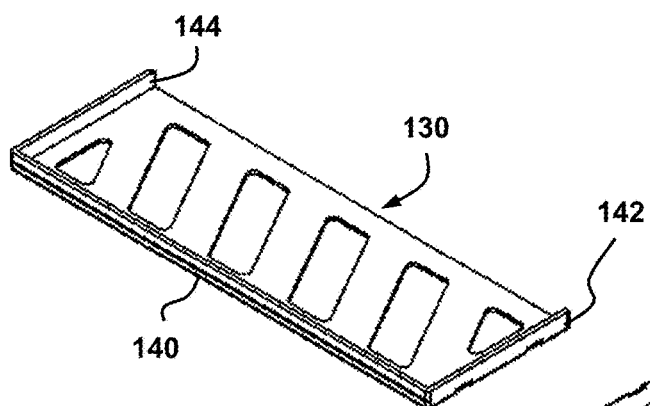
FIGS. 13 and 14 are isometric views showing the inner face and outer face respectively of an example of a variant of the lateral support.
Figure 14:
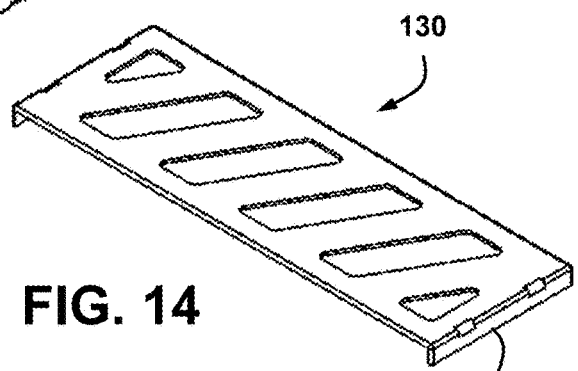

FIGS. 13 and 14 are isometric views showing inner face and outer face respectively of an example of a variant of the lateral support 130. In this example, only three rims 140, 142, 144 are used. The top ridge has no rim. The fact of eliminating this top rim facilitates loading of the boxes 100 from above.

Figure 15:
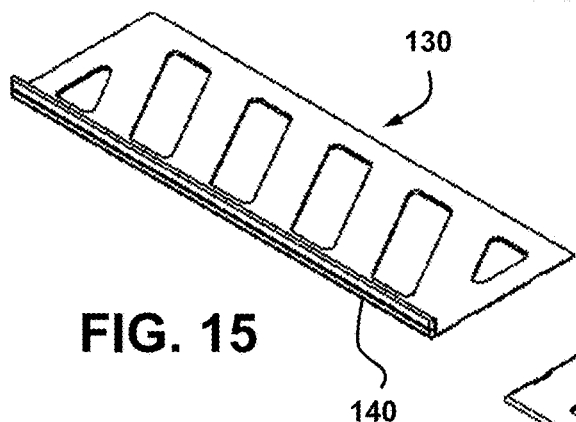
FIGS. 15 and 16 are isometric views showing the inner face and outer face respectively of an example of another variant of the lateral support.
Figure 16:
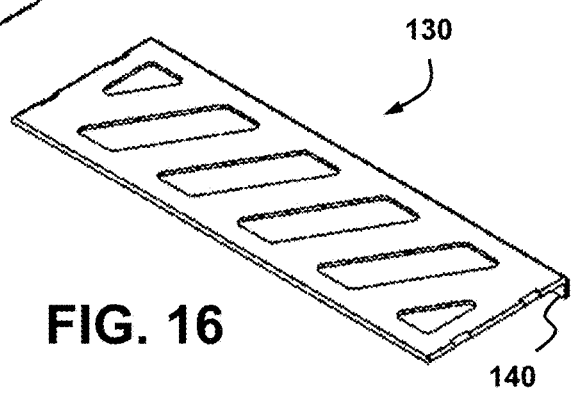

FIGS. 15 and 16 are isometric views showing the inner face and outer face respectively of an example of another variant of the lateral support 130. In this example, only one rim is used, in other words the bottom rim 140, which in particular permits even denser stacking of the empty lateral supports 130 on a transport pallet or in a similar place.

Figure 17:
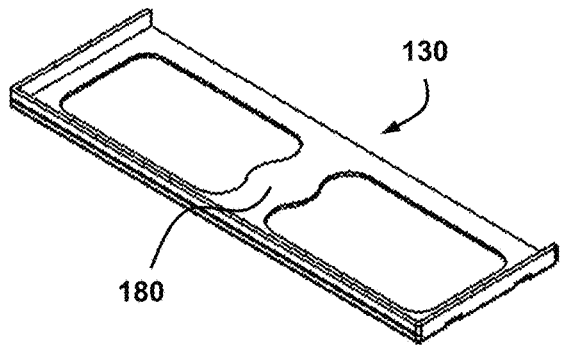
FIGS. 17 and 18 are isometric views showing the inner face and outer face respectively of an example of another variant of the lateral support.
Figure 18:
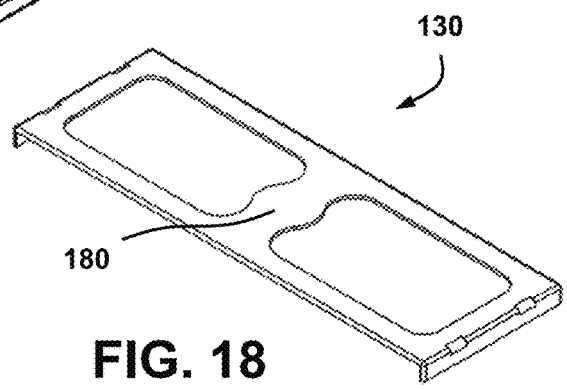

FIGS. 17 and 18 are isometric views showing the inner face and outer face respectively of an example of another variant of the lateral support 130. In this example, the lateral support 130 includes a flat, wide central part 180, situated at the center of its main side wall 132. This in particular enables the lateral support 130 to be held by suction pad when being positioned on the bundle 110.

Figure 19:
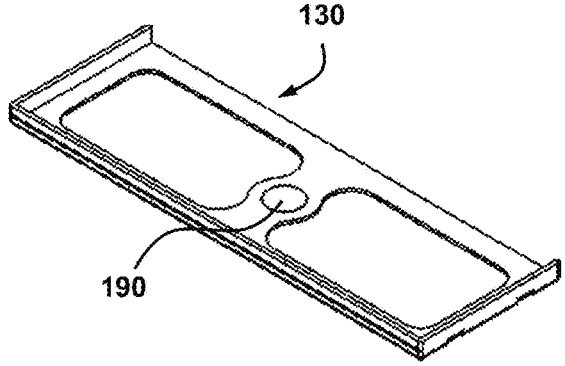
FIGS. 19 and 20 are isometric views showing the inner face and outer face respectively of an example of another variant of the lateral support.
Figure 20:
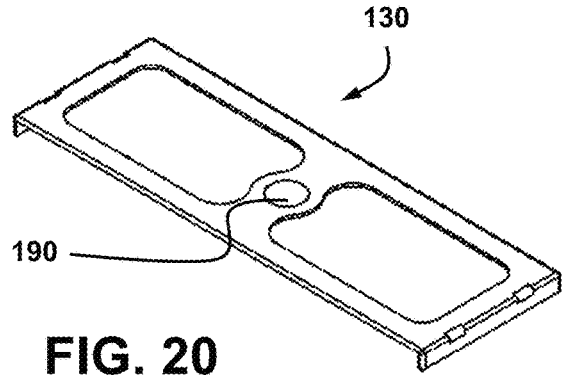

FIGS. 19 and 20 are isometric views showing the inner face and outer face respectively of an example of another variant of the lateral support 130. In this example, the lateral support 130 includes a magnetized or ferromagnetic central part 190, situated at the center of its main side wall 132. This in particular enables the lateral support 130 to be held by magnetic force when being positioned on the bundle 110.

Figure 21:
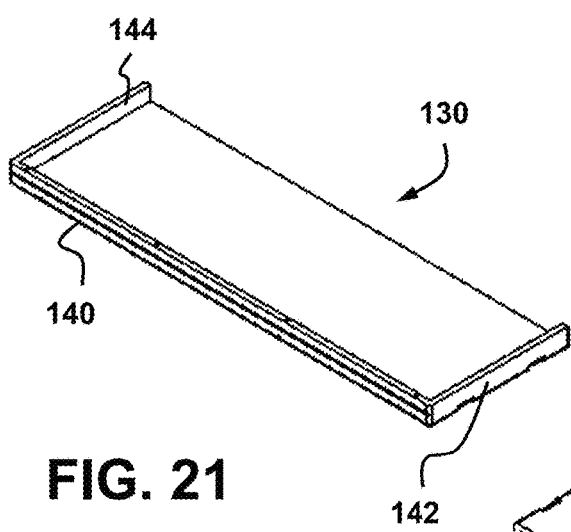
FIGS. 21 and 22 are isometric views showing the inner face and outer face respectively of an example of another variant of the lateral support.
Figure 22:
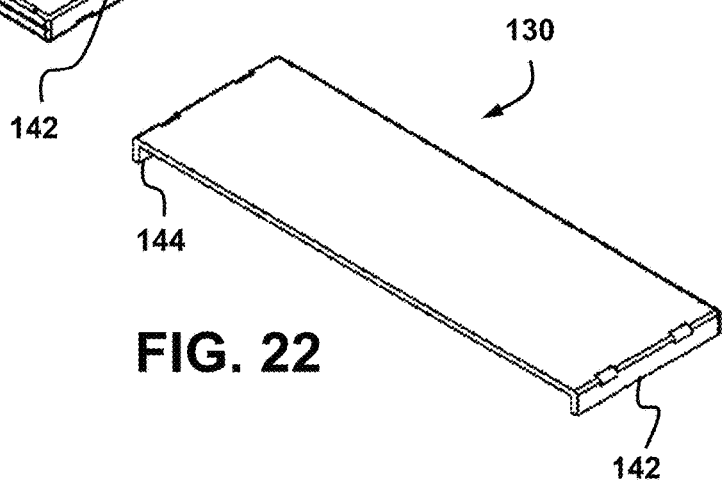

FIGS. 21 and 22 are isometric views showing the inner face and outer face respectively of an example of another variant of the lateral support 130. In this example, the main side wall has no openings.

Figure 23:
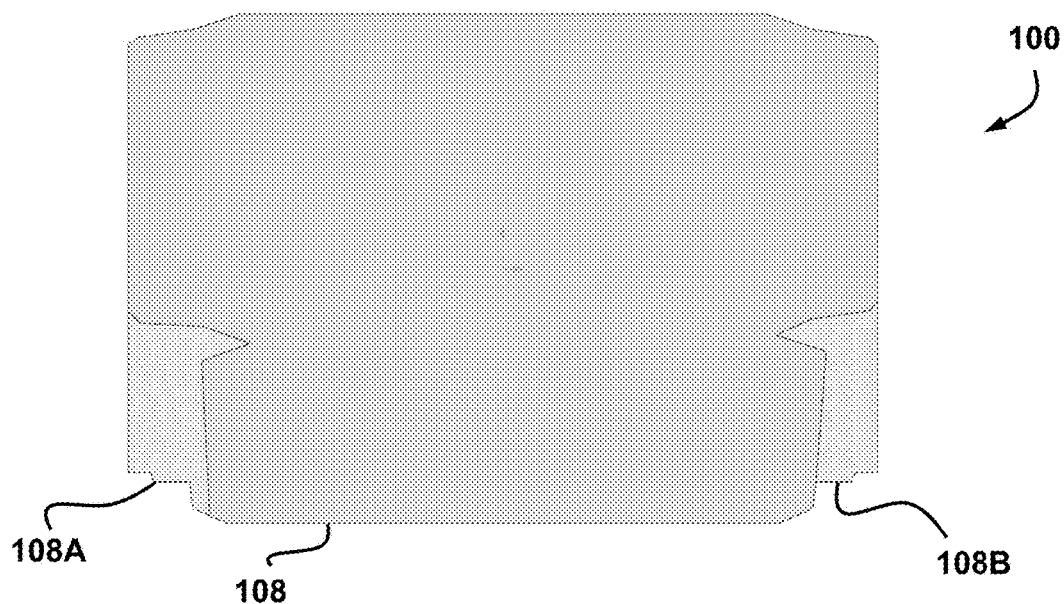
FIG. 23 is an elevation view showing an example of a flat article which is asymmetric in shape between top and bottom.

FIG. 23 is an elevation view showing an example of a flat article, in this case a box 100, with an asymmetric shape between top and bottom of the box 100 in its flat configuration. The box 100 in particular comprises a bottom ridge 108 with truncated lateral parts 108A, 108B which are not lined up with the central part of the bottom ridge 108. The retention of this type of box 100 inside the package 120 becomes complicated as the bottom rims 140 will have difficulty in reaching the central part of the bottom ridge 108 which is right at the bottom without being excessively long and this will make stacking difficult and increase the overall dimensions of the empty lateral supports 130.

Figure 24:
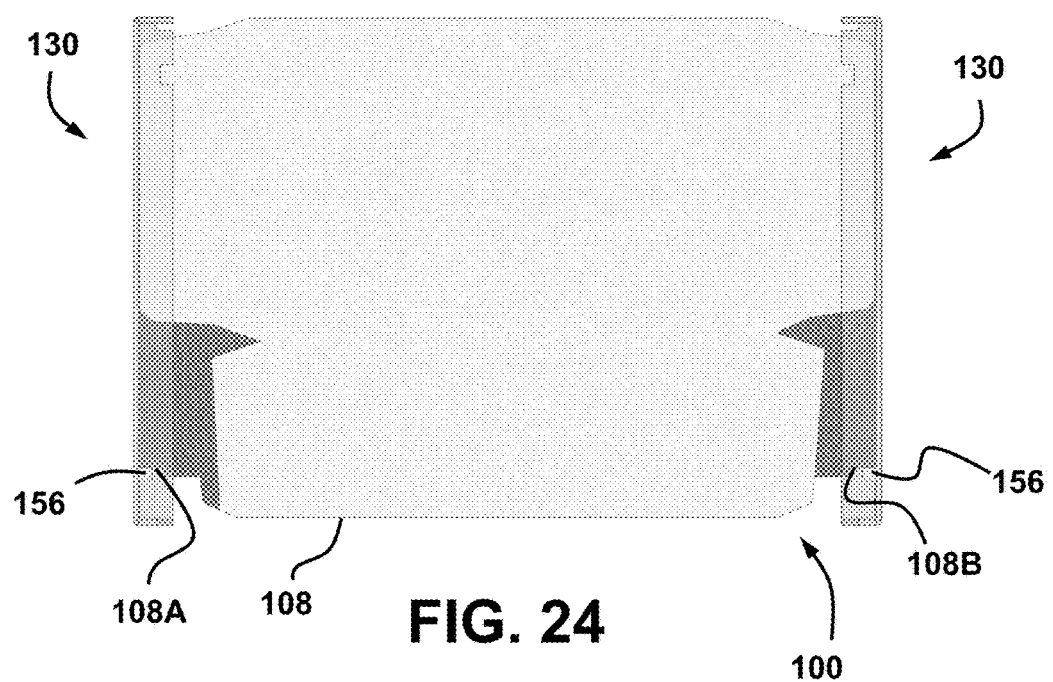
FIG. 24 is an elevation view showing an example of a pair of lateral supports serving to support asymmetric flat articles like that in FIG. 23.

FIG. 24 is an elevation view showing an example of a pair of lateral supports 130 serving to support a bundle of boxes 100 all having an asymmetric shape like that shown in FIG. 23. As may be observed, each lateral support 130 of this example comprises an inner support rail 156 whose top surface will support the underneath of the truncated lateral parts 108A, 108B, and so support the whole box 100. These lateral supports 130 thus have an additional internal piece which enables them to adapt to non-rectangular shapes of the flat articles 100 to be packaged. The inner support rail 156 can even be molded in the rest of the corresponding lateral support 130, or else be a removable piece. The inner support rail 156 is of square section in the example. Variants are possible.

Figure 25:
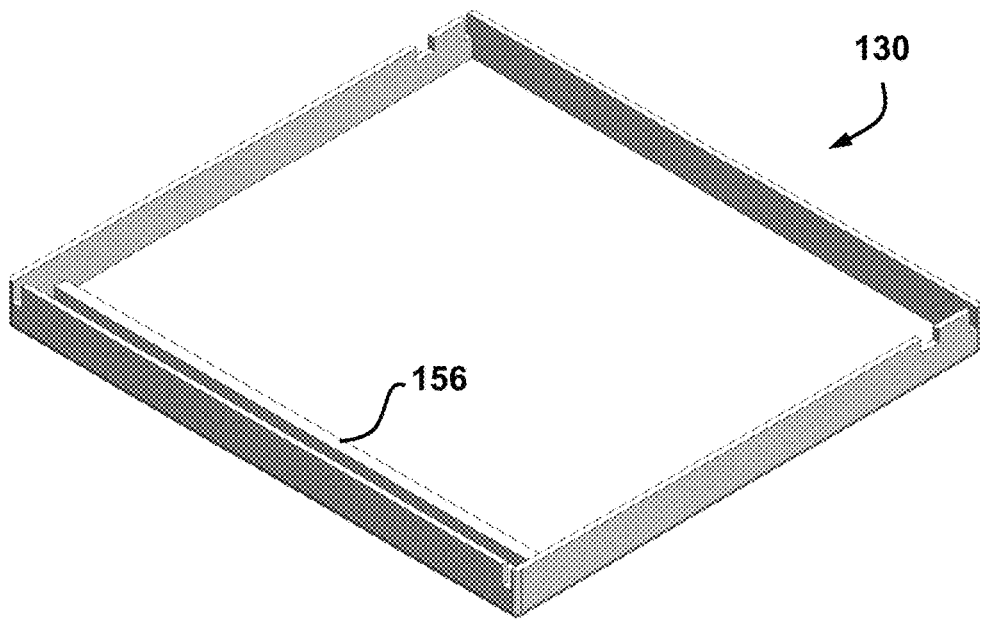
FIG. 25 is an isometric view showing one of the lateral supports used in FIG. 24.

FIG. 25 is an isometric view showing one of the lateral supports 130 of FIG. 24.

Figure 26:
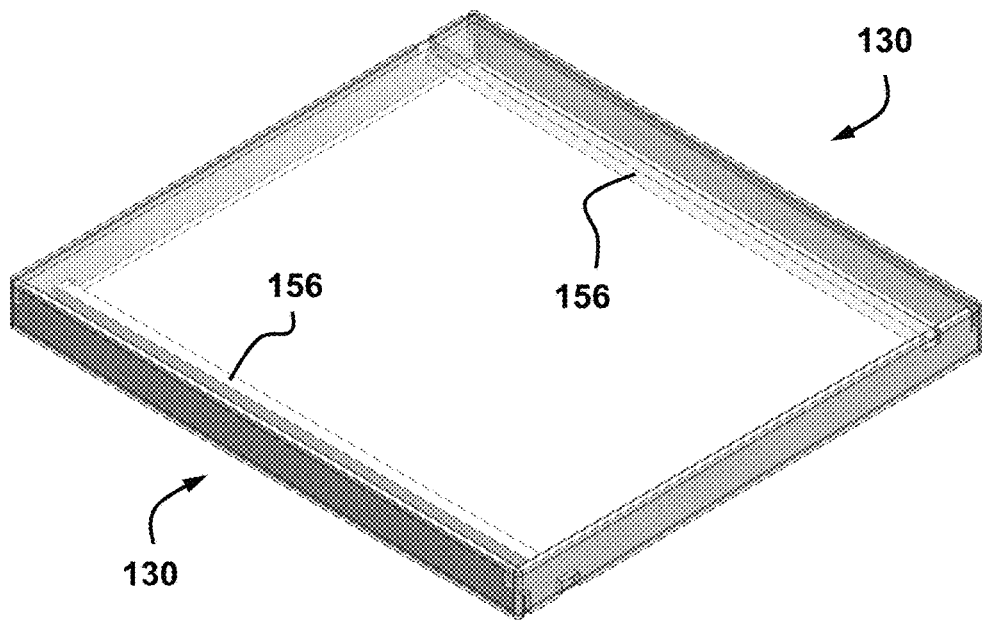
FIG. 26 is an isometric view showing the two lateral supports of FIG. 24 when they are in the interlocked position.

FIG. 26 is an isometric view showing the two lateral supports 130 of FIG. 24 when they are in the interlocked position thanks to additional notches which counter the presence of the inner support rails 156, which are visible in FIG. 26 due to transparency for the purpose of illustration only. Variants are also possible.

Figure 27:
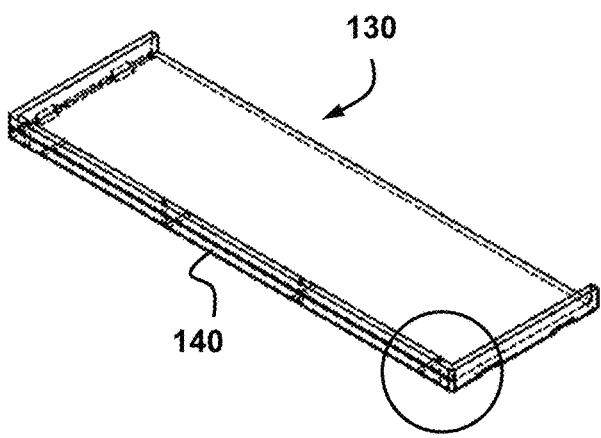
FIGS. 27 and 28 are isometric views showing the inner face and outer face respectively of an example of another variant of the lateral support.
Figure 28:
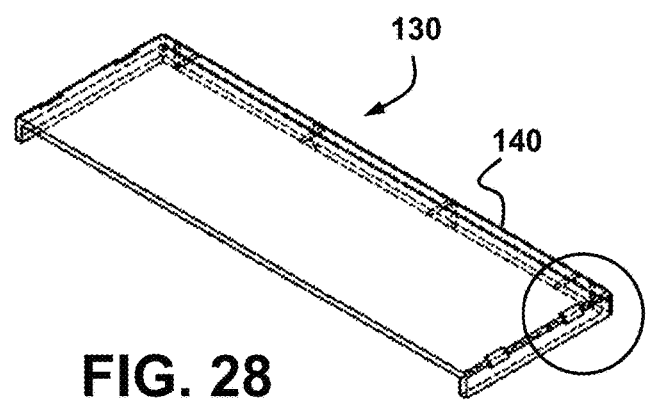

FIGS. 27 and 28 are isometric views showing the inner face and outer face respectively of an example of another variant of the lateral support 130. The lateral support 130 of this example is similar to that of FIGS. 21 and 22, but it comprises a built-in positioning component on the underneath of the bottom rim 140, preferably of the pin/hole type.

Figure 29:
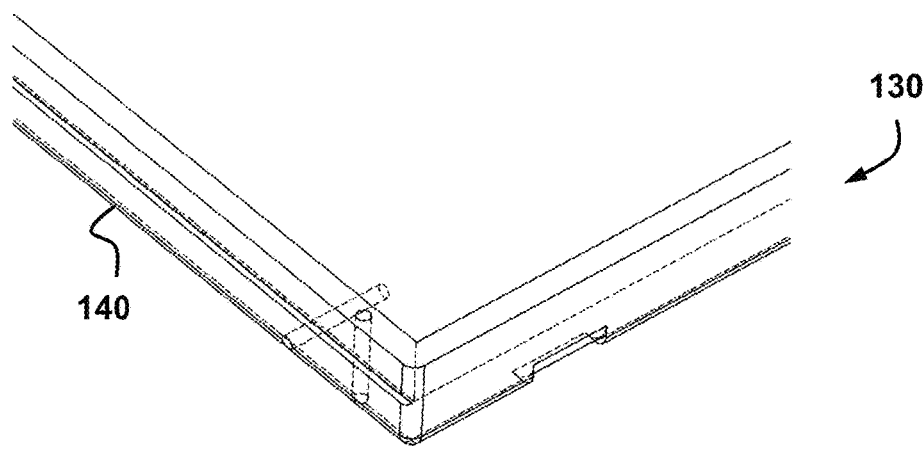
FIG. 29 is a magnified view of the region identified in FIG. 27.
Figure 30:
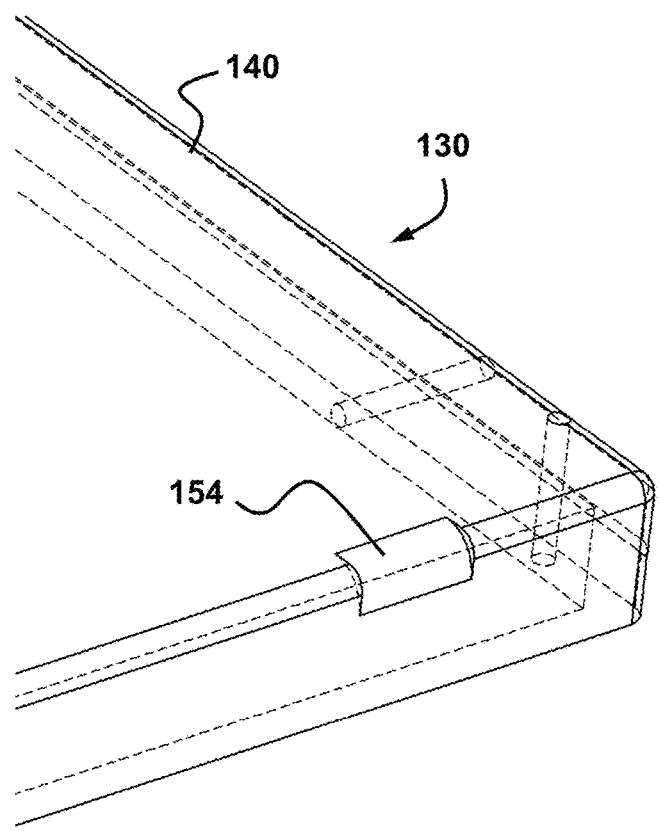
FIG. 30 is a magnified view of the region identified in FIG. 28.

FIG. 29 is a magnified view of the region identified in FIG. 27. FIG. 30 is a magnified view of the region identified in FIG. 28. FIGS. 29 and 30 show that the lateral support 130 may include a positioning component, preferably holes 158, for the insertion of pins in the bottom rim 140. It is also possible to have a positioning component with slots for the insertion of forks.

Figure 31:
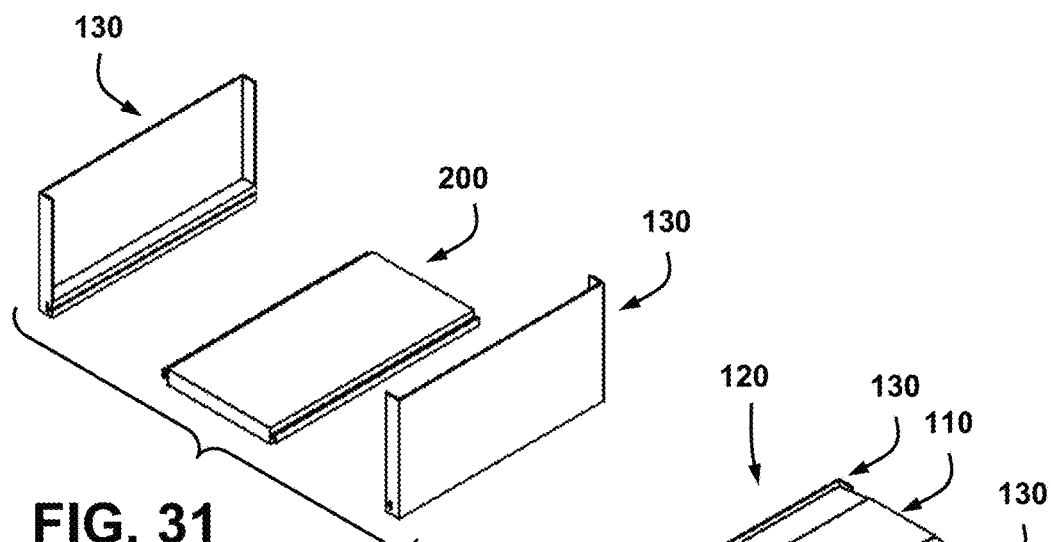
FIG. 31 is an exploded isometric view showing an example of lateral supports which use a transversal assembly base when the flat articles are loaded to form the bundle.

FIG. 31 is an exploded isometric view showing an example of lateral supports 130 which use a transversal assembly base 200 during the creation of the bundle 110. The lateral supports 130 are then slid along the lateral ridges of the assembly base 200. The assembly base 200 is positioned horizontally and receives and holds lateral supports 130 of different lengths. The same assembly base 200 is reused to pack subsequent bundles 110 because it is only used at the loading stage.

Figure 32:
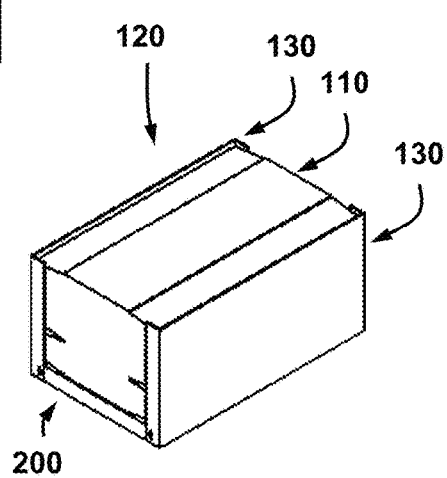
FIG. 32 is an isometric view showing the lateral supports and the transversal assembly base of FIG. 31, in their assembled position.
Figure 33:
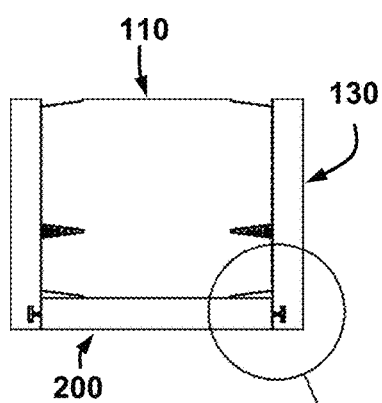
FIG. 33 is a front view of the bundle of FIG. 32 with the lateral supports and transversal assembly base.
Figure 34:
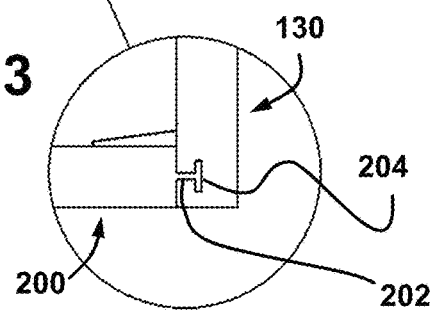
FIG. 34 is a magnified view showing the connection system between the bottom and one of the lateral supports and the transversal assembly base of FIG. 33.

FIG. 32 is an isometric view showing the side supports 130 and the transversal assembly base 200 of FIG. 31 in their assembled position in order to receive and hold a bundle 110. FIG. 33 is a front view of the bundle 110 of FIG. 32 with the lateral supports 130 and its transversal assembly base 200. FIG. 34 is a magnified view showing the connection system between the bottom of one of the lateral supports 130 and the transversal assembly base 200 of FIG. 33. As may be observed, this example shows the transversal assembly base 200 having a connection system which consists of side parts 202 with a "T" shaped profile and which extend along its longitudinal lateral ridges. The lateral supports 130 have grooves 204 whose shape corresponds to that of the side parts 202. The grooves 204 also extend across vertical rims. In this way, the lateral supports 130 can be temporarily attached to the assembly base 200 by sliding. The assembly base 200 can be removed once the bundle 110 is in place. Variants are also possible.

Figure 35:
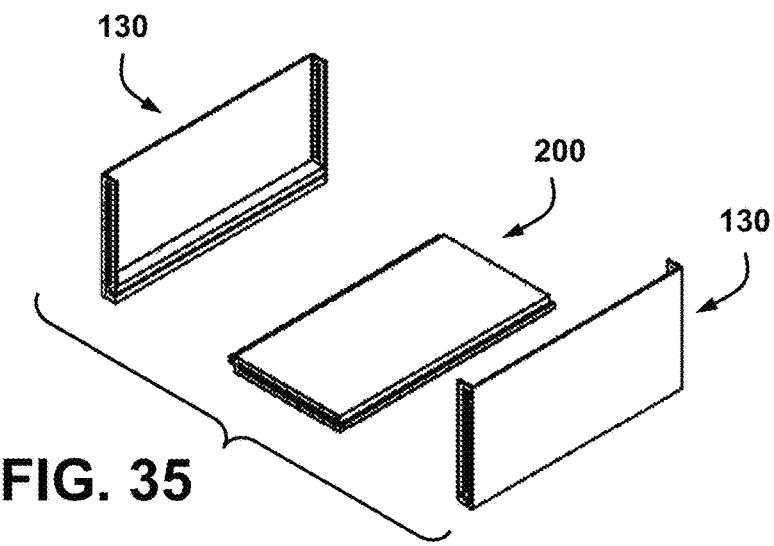
FIG. 35 is a similar view to FIG. 31, but in which the connection system between the lateral supports and the transversal assembly base is different from that used in the example in FIG. 31.
Figure 36:
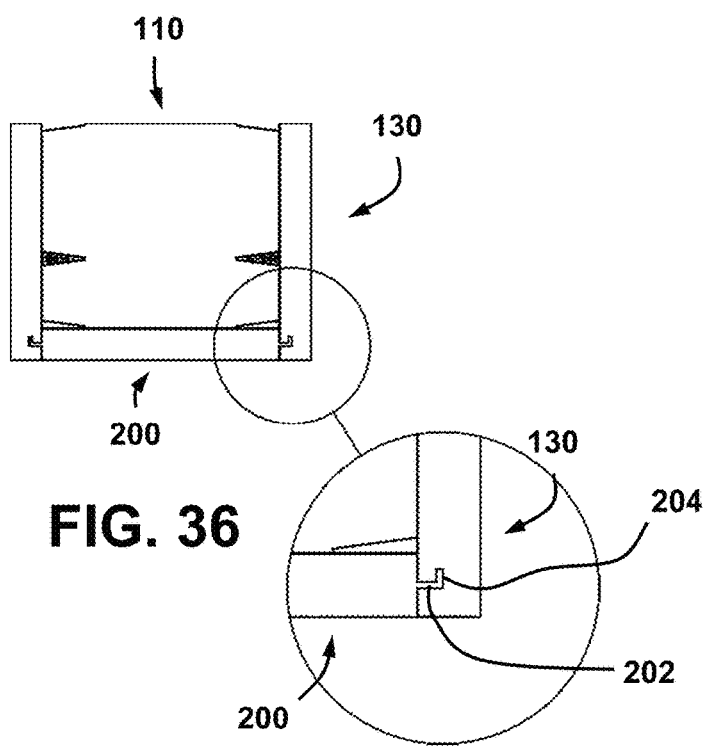
FIG. 36 is a front view showing the lateral supports and the transversal assembly base of FIG. 35 in their assembled position.
Figure 37:
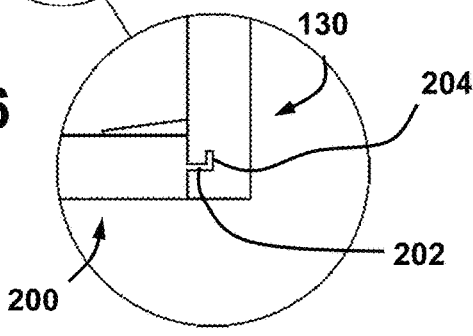
FIG. 37 is a magnified view showing the connection system between one of the lateral supports and the transversal assembly base of FIG. 36.

FIG. 35 is a similar view to FIG. 31 but in which the connection system between the lateral supports 130 and the transversal assembly base 200 is different from that used in the example in FIG. 31. FIG. 36 is a front view showing the lateral supports 130 and the transversal assembly base 200 of FIG. 35 in their assembled position in order to hold a bundle 110. FIG. 37 is a magnified view showing the connection system between one of the lateral supports 130 and the transversal assembly base of FIG. 36. As may be observed, the connection system comprises the side parts 202 which have an "L" shaped profile and grooves 204 of corresponding shape on the lateral supports 130.

It should be noted that several other shape and configuration variants are possible. Moreover, the relative position of the side parts 202 and grooves 204 may be reversed.

This detailed description and the corresponding figures are only examples. A person working in the field will be able to acknowledge that variants may be introduced which remain within the framework of the proposed concept.

REFERENCE NUMBERS 100 box/flat article
102 lateral ridge
104 lateral ridge
106 top ridge
108 bottom ridge
108A truncated lateral part
108B truncated lateral part
110 bundle
112 longitudinal axis
120 free-standing package
130 lateral support
132 main side wall
134 opening
136 cavity
140 horizontal bottom rim
142 vertical rim
144 vertical rim
146 horizontal top rim
148 notch
150 film
152 tensioned strap
154 rounded outer groove
156 inner support rail
158 hole
160 transport pallet
170 transport pallet
180 flat wide central part
190 magnetized or ferromagnetic central part
200 transversal assembly base
202 side part
204 groove

What is claimed is:

1. A device for forming a free-standing package with an open, light structure capable of packing a bundle of individual flat articles, each flat article having a height, width, and thickness, which thickness is a smaller dimension than the width and thickness, the bundle being formed from several of these flat articles placed in direct juxtaposition and aligned, along a straight longitudinal axis, in the direction of the thickness of the flat articles, the bundle having a height, width, and length, the length of the bundle being in the direction of the longitudinal axis, the device including:

a pair of individual rigid lateral supports, which are opposite each other and which will rest directly on the respective sides of the bundle, each lateral support comprising a main side wall positioned parallel to the longitudinal axis in the package, the main side wall comprising an outer face and an inner face, the inner face resting directly on a corresponding lateral ridge of each of the flat articles in the bundle in order to immobilize them in use in a cavity formed between the two opposite inner faces of the two lateral supports, the height and length of the cavity being at least equal to the height and length of the bundle, each lateral support also having an inner part to vertically support each of the flat articles to be placed in the cavity; and means incorporated in the free-standing package for holding the lateral supports in the packaging position against the bundle;

each lateral support comprising at least an inner rim which extends along a bottom ridge of the main side wall and which borders the inner face of the main side wall, the rim constituting the inner part which will vertically support each of the flat articles, each rim forming an integral part of a monolithic piece which comprises the corresponding main side wall; and the opposite inner faces of the lateral supports of each pair are imbricately mating with one another when not in use to reduce stacking space.

2. The device according to claim 1, wherein each rim extends continuously and is positioned perpendicularly to the corresponding main side wall.

3. The device according to claim 1, wherein each lateral support comprises three inner rims which border the inner face of the main side wall, with the first rim extending along a bottom ridge of the main side wall, and the second and third rims extending along a corresponding vertical ridge on the main side wall, with the main side wall including a top ridge with no inner rim to facilitate loading of the flat articles from the top.

4. The device according to claim 3, wherein the rims situated along each vertical ridge of the main side wall of each lateral support each comprise a notch at one end, the two notches being lined up with each other so that the two lateral supports of the pair on the side of their inner faces can be interlocked when not in use.

5. The device according to claim 3, wherein the rims of each lateral support substantially have the same width.

6. The device according to claim 1, wherein the means incorporated in the free-standing package for holding the lateral supports in position against the bundle comprise a film surrounding the lateral supports.

7. The device according to claim 6, wherein the film is a stretch plastic film wrapped round in several layers, or a heat-shrink plastic film.

8. The device according to claim 6, wherein the film forms a hermetic barrier around the bundle.

9. The device according to claim 1, wherein the means incorporated in the free-standing package for holding the lateral supports in position against the bundle comprise at least one tensioned strap which rests on the outside of the lateral supports.

10. The device according to claim 9, wherein the device includes one of the following two features:
two tensioned straps are used, the two straps being spaced apart;
each lateral support comprises rounded outer grooves situated on the outside of the lateral supports and against which the tensioned strap(s) will rest to facilitate strapping and holding in place after strapping.

11. The device according to claim 1, wherein the device includes at least one of the following features:
the main side wall of each lateral support is substantially rectangular and flat in shape;
the main side wall comprises at least one opening between its inner face and outer face;
the lateral supports of the pair are of identical shape;
each lateral support comprises four inner rims which border the inner face of the main side wall, with the first rim extending along a bottom ridge on the main side wall, the second and third rims extending along a corresponding vertical ridge of the main side wall, and the fourth rim extending along a top ridge of the main side wall;
the inner part which vertically supports each of the flat articles of at least one of the two lateral supports of the pair consists of an inner support rail placed adjacent to the inner face of the corresponding main side wall and which extends parallel to the longitudinal axis;
the means incorporated in the free-standing package for holding the lateral supports in position against the bundle are situated outside the cavity formed between the two opposite inner faces of the lateral supports;
the lateral supports are made of a material selected from the group comprising plastic, aluminum, and carbon fiber;
the main side wall of each lateral support comprises a flat wide central part for handling the lateral support by suction pad;
the main side wall of each lateral support comprises a central part with a magnet or made of a ferromagnetic material enabling the lateral support to be handled by magnetic force.

12. The device according to claim 1, wherein the lateral supports comprise a connection system for securing them, in a fixed manner, to a horizontal transversal assembly base before adding the means incorporated in the free-standing package to hold the lateral supports in the packing position against the bundle for the loading of the flat articles.

13. A free-standing package consisting of a bundle made of a set of flat articles which are substantially parallelepiped in shape and which are held in position under the effect of a compression force transmitted using two lateral supports, with each lateral support being positioned on one side and the other of the bundle and the bundle being held in position in a cavity formed between two opposite interior faces of the two lateral supports, the cavity having a height and a length that are at least equal to the height and the length of the bundle, each lateral support also having an internal part that vertically supports each of the flat articles, each lateral support further including at least an inner rim which extends along a bottom ridge of the main side wall and which borders the inner face of the main side wall, the rim constituting the inner part which vertically supports each of the flat articles and on which a portion of a bottom ridge of each of the flat articles rests in the package, each rim forming an integral part of a monolithic piece which comprises the corresponding main side wall; and the opposite inner faces of the lateral supports of each pair are imbricately mating with one another when not in use to reduce stacking space.

14. The free-standing package according to claim 13, wherein the flat articles have a shape memory.

15. The free-standing package according to claim 14, wherein the flat articles are partially compressed in the direction of their thickness inside the bundle of the free-standing package, the compression being limited so as not to affect or damage the flat articles.

16. The free-standing package according to claim 13, wherein the lateral supports are held in position by at least one of the following features: straps positioned around the lateral supports, tying strings positioned around the lateral supports, a stretch film positioned around the lateral supports, and a heat-shrink film positioned around the lateral supports.

17. The free-standing package according to claim 13, wherein the free-standing package includes at least one of the following features:

the flat articles in the bundle are identical and are positioned in the same orientation or alternately in packs;

the flat articles are folding cartons comprising glued panels;

the flat articles are substantially parallelepiped in shape.

18. A device for forming a free-standing package with an open, light structure capable of packing a bundle of individual flat articles, each flat article having a height, width, and thickness, which thickness is a smaller dimension than the width and thickness, the bundle being formed from several of these flat articles placed in direct juxtaposition and aligned, along a straight longitudinal axis, in the direction of the thickness of the flat articles, the bundle having a height, width, and length, the length of the bundle being in the direction of the longitudinal axis, the device including:

a pair of individual rigid lateral supports, which are opposite each other and which will rest directly on the respective sides of the bundle, each lateral support comprising a main side wall positioned parallel to the longitudinal axis in the package, the main side wall comprising an outer face and an inner face, the inner face resting directly on a corresponding lateral ridge of each of the flat articles in the bundle in order to immobilize them in use in a cavity formed between the two opposite inner faces of the two lateral supports, the height and length of the cavity being at least equal to the height and length of the bundle, each lateral support also having an inner part to vertically support each of the flat articles to be placed in the cavity; and means incorporated in the free-standing package for holding the lateral supports in the packaging position against the bundle; and each lateral support comprising three inner rims which border the inner face of the main side wall, with the first rim extending along a bottom ridge of the main side wall, and the second and third rims extending along a corresponding vertical ridge on the main side wall, with the main side wall including a top ridge with no inner rim to facilitate loading of the flat articles from the top.

19. The device according to claim 18, wherein the rims situated along each vertical ridge of the main side wall of each lateral support each comprise a notch at one end, the two notches being lined up with each other so that the two lateral supports of the pair on the side of their inner faces can be interlocked when not in use.

20. The device according to claim 18, wherein the rims of each lateral support substantially have the same width.

\* \* \* \* \*